(12) United States Patent
Lichter et al.

(10) Patent No.: US 6,256,489 B1
(45) Date of Patent: *Jul. 3, 2001

(54) ENHANCED EMERGENCY SERVICE FOR ISDN BASED EMERGENCY SERVICES IN A WIRELESS TELECOMMUNICATIONS SYSTEM

(75) Inventors: Joseph James Lichter, Naperville; Michael Joseph Meyer, Yorkville; Ted Moulos, Lisle, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/847,370

(22) Filed: Apr. 24, 1997

(51) Int. Cl.[7] ............................................ H04Q 7/22
(52) U.S. Cl. ........................ 455/404; 455/445; 455/456
(58) Field of Search ................................. 455/403, 404, 455/445, 456, 457, 560, 433, 435; 379/37, 45, 127; 370/351–355; 340/988, 990, 825.36

(56) References Cited

U.S. PATENT DOCUMENTS

| | | | |
|---|---|---|---|
| 5,334,974 | * | 8/1994 | Simms et al. ..................... 455/988 |
| 5,519,760 | * | 5/1996 | Borkowski et al. ................ 455/404 |
| 5,596,625 | * | 1/1997 | LeBlanc ............................. 455/404 |
| 5,646,606 | * | 7/1997 | Wilson et al. ................. 340/825.36 |
| 5,864,755 | * | 1/1999 | King et al. ......................... 455/404 |
| 5,873,040 | * | 2/1999 | Dunn et al. ........................ 455/456 |

* cited by examiner

Primary Examiner—Reinhard J. Eisenzopf
Assistant Examiner—Lester G. Kincaid
(74) Attorney, Agent, or Firm—Mony R. Ghose; John B. MacIntyre

(57) ABSTRACT

The system of the invention passes wireless caller location information through the common channel signaling network (CCSN) to the PSAP such that the PSAP can provide enhanced emergency services. The caller location information such as the latitude and longitude of the wireless device or the cell and cell sector from which a call is made is encoded in the ISUP (ISDN User Part) of the call set up message over the CCSN. The public switched network routes the call based on the called party number (CDPN) parameter to the appropriate selective router and the selective router routes the call to the appropriate PSAP based on the caller location. The caller location information is transmitted over an ISDN interface to the PSAP. The PSAP can then access additional caller information based on the CDPN parameter to provide enhanced emergency services. Thus, the system of the invention allows enhanced 9-1-1 service to be provided in wireless systems while utilizing existing wireless infrastructure and protocols.

9 Claims, 3 Drawing Sheets

ENHANCED EMERGENCY SERVICE FOR ISDN BASED EMERGENCY SERVICES IN A WIRELESS TELECOMMUNICATIONS SYSTEM

CROSS REFERENCE TO RELATED APPLICATION

This application is related to the applications of:

Terry Jacobson, Michael J. Meyer, and Ted Moulos entitled "Enhanced Emergency Service For Analog Based Emergency Services In A Wireless Communication System" Ser. No. 08/847,371; and Eugene Gerber, Michael J. Meyer, and Ted Moulos entitled "Enhanced Emergency Service For Wireless Communication Systems Providing Prioritized Caller Location Information" Ser. No. 08/847,372 which applications are assigned to the assignee of the present application, and are being filed concurrently herewith.

BACKGROUND OF THE INVENTION

The invention relates, generally, to public safety communication systems such as 9-1-1 emergency service and, more particularly, to a system for providing enhanced 9-1-1 capabilities in wireless communication systems.

It will be understood that emergency service is widely provided as 9-1-1 service where a caller can reach emergency services such as police, fire, ambulance or the like by dialing 9-1-1. Enhanced 9-1-1 service provides the entity responsible for handling the emergency call, commonly referred to as the public safety answering position (PSAP), with the calling party's location, telephone number and other information related to the calling party. Providing this information to the PSAP enables the PSAP to locate the calling party even if the calling party is unable to identify his or her location and to reestablish contact with the calling party even if the original emergency call is terminated. Thus, the ability of a communications system to provide enhanced 9-1-1 service dramatically improves public safety.

In the typical land line 9-1-1 service application, an automatic number identification (ANI) is associated with each customer line such that there is a one to one relationship between ANI numbers and customer locations. When a calling party's 9-1-1 emergency call is forwarded to the selective router switching system serving the 9-1-1 call, the call set up message includes the ANI number. An ANI data base, accessible by the selective router switching system, maintains a mapping of ANI numbers to emergency service zones. Specifically, the geographic area served by the switching system is divided into emergency service zones (ESZs) where each ESZ encompasses a portion of the customers hosted by the switching system. Thus, every ANI number is correlated with one of the ESZs although each ESZ serves many ANI numbers. The switching system, after identifying the appropriate ESZ from the ANI data base, forwards the emergency call to the PSAP responsible for that ESZ. The ANI number is also forwarded to the PSAP in the call set up message. The PSAP accesses an automatic location information (ALI) data base where customer information such as customer's name, physical location such as address or latitude and longitude, telephone number and the like can be retrieved based on the ANI number. Once the PSAP obtains this information, it can direct emergency services to the appropriate location, call back the calling party if disconnected and otherwise provide enhanced services.

While the above-described system works well for land line telephones, it is not possible to process emergency calls from mobile wireless devices in the same manner. Because mobile wireless communication devices are by definition not tied to a particular customer location, an ANI number for the mobile device cannot be translated to the present location of the device (the ANI number for a mobile device is typically correlated to the customer's billing address). As a result, efforts have been made to provide enhanced 911 service for mobile communication devices. One such system uses a location detection device that is capable of locating the latitude and longitude of a mobile caller by triangulating on the 9-1-1 signal transmitted by the mobile device. A data link between the location detection device and the ALI data base allows the latitude and longitude to be transmitted from the location detection device to the ALI data base where it can be retrieved by the PSAP. While such a system can be effective it requires that a location detection device be located near all cell sites and that a data link be established between each location detection device and with the ALI serving the relevant PSAP. Moreover, because the information is transmitted outside of the call set up sequence and public switched telephone network, communication between the location detection device, the mobile switching center, the ALI and ANI data bases, the switching system and the PSAPs must be administered and coordinated. Thus, implementation of the system is expensive and resource intensive.

Thus, an improved system for providing enhanced 9-1-1 service in wireless communication systems is desired.

SUMMARY OF THE INVENTION

The system of the invention enables wireless caller location information to be passed through the common channel signaling network (CCSN) to the PSAP such that the PSAP can provide enhanced emergency services. The caller location information such as the latitude and longitude of the wireless device or the cell and cell sector from which a call is made is encoded in the ISUP (ISDN User Part) of the call set up message over the CCSN. The public switched network routes the call based on the called party number (CDPN) parameter to the appropriate PSAP and transmits the caller location information over an Integrated Services Digital Network (ISDN) interface to the PSAP. The PSAP can then access additional caller information based on the CDPN parameter to provide enhanced emergency services. Thus, the system of the invention allows enhanced 9-1-1 service to be provided in wireless systems while utilizing existing wireless, switched network and PSAP infrastructure and protocols.

DETAILED DESCRIPTION OF THE INVENTION

Figure 1:
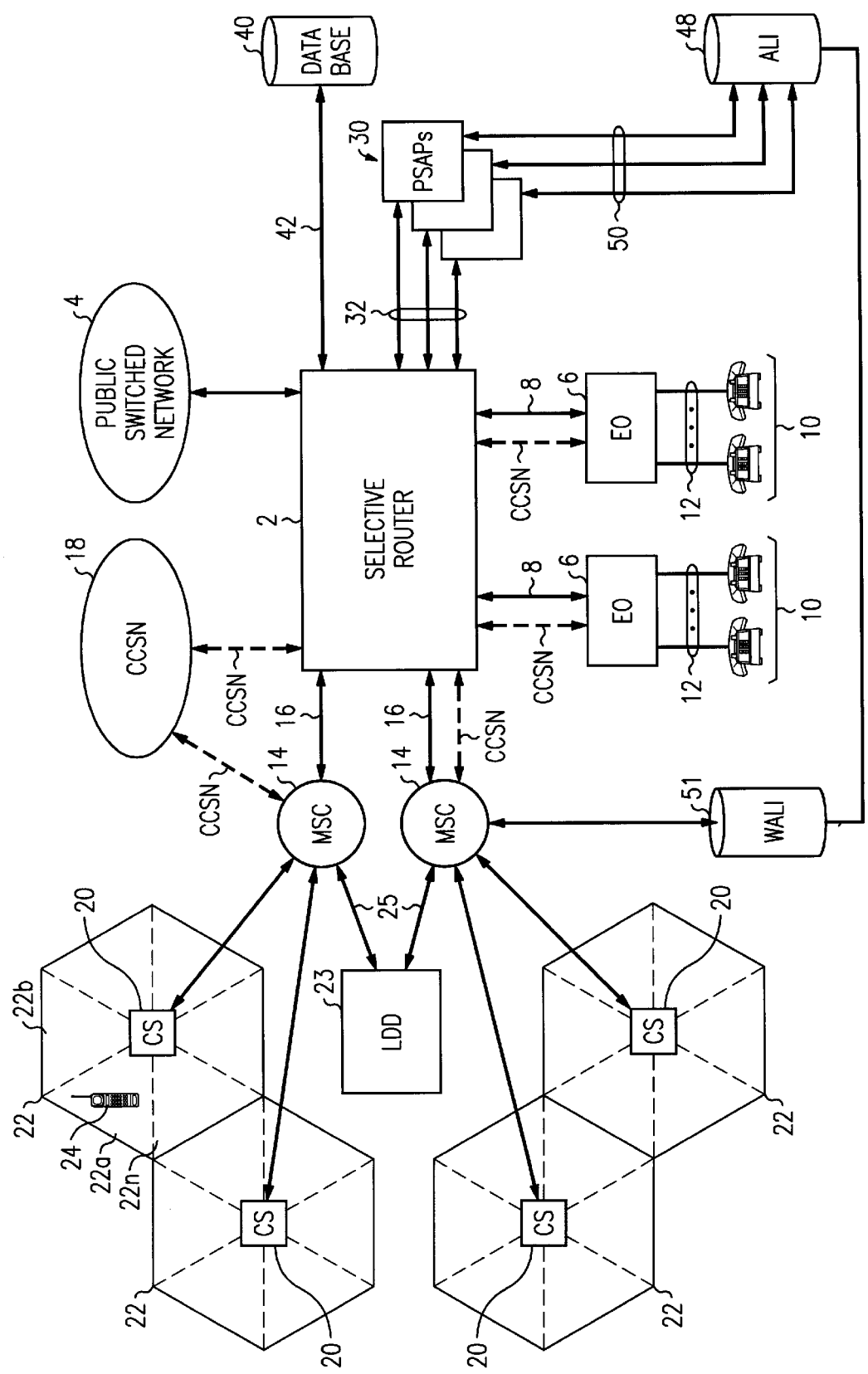
FIG. 1 is a block diagram showing a communications network employing the system of the invention.

The system of the invention can be used in a wireless communication network such as the one illustrated in FIG. 1 consisting of a switching system 2 such as the 5ESS® switching system manufactured and sold by Lucent Technologies Inc. In the illustrated system, switching system 2, known as a selective router, is the switching system in the network responsible for routing an incoming emergency call to the appropriate PSAP and can consist of any switch having a switch fabric capable of routing voice and data through the network 4. Selective router 2 is typically connected to one or more end offices 6 via trunks 8 where the end offices 6 also consist of switching systems such as the 5ESSE® switching system or any switch capable of routing voice and data through the network. The end offices 6 host customer premise equipment (CPE) 10 such as telephones, personal computers, fax machines or the like over customer lines 12. Selective router 2 is also connected to one or more mobile switching centers (MSC) 14 over trunks 16. It will be appreciated that the end offices 6 can also host MSCs. As is known in the art, the MSCs 14, end offices 6 and selective routers 2, in addition to the voice and data communications channels described above, communicate with one another over an overlay common channel signaling network (CCSN) 18 such as the SS7 network for transmitting control and signal messaging. The CCSN can connect the network elements directly using a point-to-point connection, or the connection can be made through the CCSN network as illustrated.

Each MSC 14 is connected to at least one cell site 20 consisting of a radio transmitter/receiver for establishing an air interface with wireless communication devices 24 located in the cell 22 served by that cell site. It is to be understood that in the typical wireless system, cell sites are arranged such that the cells are contiguous thereby allowing the wireless communication devices 24 to move between cells 22. In the system of the invention each cell is divided into sectors 22a, 22b . . . 22n where each cell sector encompasses a predetermined geographic area of the cell. Each cell site 20 is capable of determining where in the cell a wireless call either originates or terminates. Thus, the cell site can determine the cell sector in which an active mobile communications device is located. The cell site determines the location of a wireless communicating device by using directional antennas as is known in the art.

A location detection device 23 is also provided in the vicinity of the cell site 20. Location detection device 23 can determine the latitude and longitude of a wireless device 24 by triangulating on the radio signal transmitted by the wireless device using angle of arrival, time difference of arrival, signal direction or other known techniques or by using a global positioning system (GPS) or other similar system as are known in the art. A single location detection device can service more than one cell site. The location detection device 23 is connected to MSC 14 via data link 25 such that the location detection device 23 can transmit the longitude and latitude of a wireless device to the MSC 14. The location detection device is capable of detecting and recognizing the calling device's directory number (i.e. the call back number of the mobile device) and transmits this number to the MSC with the latitude and longitude such that the MSC can correlate the latitude and longitude to the call based on the directory number.

The selective router 2 is also connected to a plurality of PSAPs 30 over interfaces 32. In the preferred embodiment, interfaces 32 comprise ISDN interfaces although analog interfaces can also be used. In the system of the invention, the routing of the call is different for the two interfaces as will hereinafter be explained. Each PSAP is responsible for administering emergency calls forwarded to it from the selective router 2. Specifically, each PSAP is responsible for serving calls that originate from a particular geographic area. The geographic areas served by the PSAPs are known as emergency service zones (ESZs). The selective router 2, as will hereinafter be explained, routes the call to the PSAP serving the geographic area from which the emergency call originates. The PSAP, after being connected to the calling party, serves the call by advising police, fire or other emergency personnel of the nature of the call or by taking other action as appropriate.

The system of the invention also includes a data base 40 accessible by the selective router over data link 42. As is known, the data base contains a correlation between ANI numbers and emergency service zones (ESZs) for land line calls so that the selective router 2, upon receipt of an ANI from a land line CPE 10, can identify the emergency service zone for that call and direct the call to the PSAP serving that ESZ. In the system of the invention the data base 40 is modified to also include a correlation between ESZs and cell and cell sector numbers and ESZs and latitudes and longitudes so that the system can identify the ESZ corresponding to the actual location of mobile communications equipment as will hereinafter be described. An ALI data base 48 is also provided that is accessible by the PSAPs over data links 50. The ALI data base 48 includes a correlation between directory number and the subscriber information such as name, billing address, latitude and longitude of the billing address and any other information required by the PSAP for processing the emergency call. Data base 48 could also contain a correlation between cell/sector or latitude/longitude and other location information such as the street address of the cell site, the coverage area of the cell, the nearest cross-streets or the like.

The operation of the system of the invention will now be described with reference to FIG. 2. When a 9-1-1 call is received from a mobile unit at the cell site 20 serving that cell, the cell site 20 determines the cell sector from which the call was received and transmits the identification of the cell sector to the MSC. It will be understood that the existing common channel signaling (CCS) protocol includes an ISUP initial address message (IAM) that is transmitted from the network element serving the call, such as the MSC or end office, to the switching system hosting the called party. In the system of the invention, the MSC assigns a pseudo dialed digit (PDD) number corresponding to the cell/sector and populates the called party number field (CDPN) in the ISUP initial address message (IAM) with the PDD (block 201). The PDD is a unique number assigned by the system operator to identify each cell/sector. The actual dialed digits, 9-1-1, are not included in the IAM. The latitude and longitude are also transmitted to the MSC 14 from the location detection device 23 and populated in the generic digital parameter (GDP) field of the IAM message (block 202). If the MSC does not have access to a location detection device, this field is populated with the latitude and longitude of the cell site serving the call. The call back number, i.e. the ten digit directory number of the mobile unit, is included in the charge number field and/or calling number field of the IAM (block 203) depending on which field the switch recognizes as transmitting the call back number. The IAM's emergency service indicator is set showing that the call is an emergency call (block 204). The IAM populated with the PDD, latitude/longitude, call back number and the emergency service indicator is forwarded to the selective router over the common channel signaling network (CCSN) to set up the call (block 205). While specific fields in the IAM have been described, it will be appreciated that the actual fields populated with this information can vary.

If the interface 32 between the selective router 2 and PSAPs 30 is an ISDN interface, either a basic rate interface (BRI) or a primary rate interface (PRI), the selective router uses either the cell and cell sector information or the latitude and longitude received from the MSC to query the data base 40 (block 206). The decision as to whether the latitude/longitude or cell/sector information is to be used for this query will be hereinafter described. Upon receipt of the query from the selective router 2, data base 40 returns an emergency services number (ESN) to the selective router (block 207). The ESN identifies the ESZ covering the geographic area encompassing the latitude/longitude or cell/sector received from the MSC. The selective router translates the ESN into a telephone number of the PSAP responsible for that ESN and completes the connection to that PSAP (block 208). The selective router then transmits the latitude/longitude and/or cell/sector information and the 10 digit directory number of the calling wireless device to the PSAP during call set-up over the D-channel of the ISDN interface 32 in a Q.931 message (block 209). The PSAP can then query the ALI data base 48 using the 10 digit directory number to obtain additional customer information or query using the latitude/longitude or cell/sector to obtain additional geographic area information (block 210). If necessary, the ALI data base can query a wireless automatic location information (WALI) data base for additional information.

Figure 2:
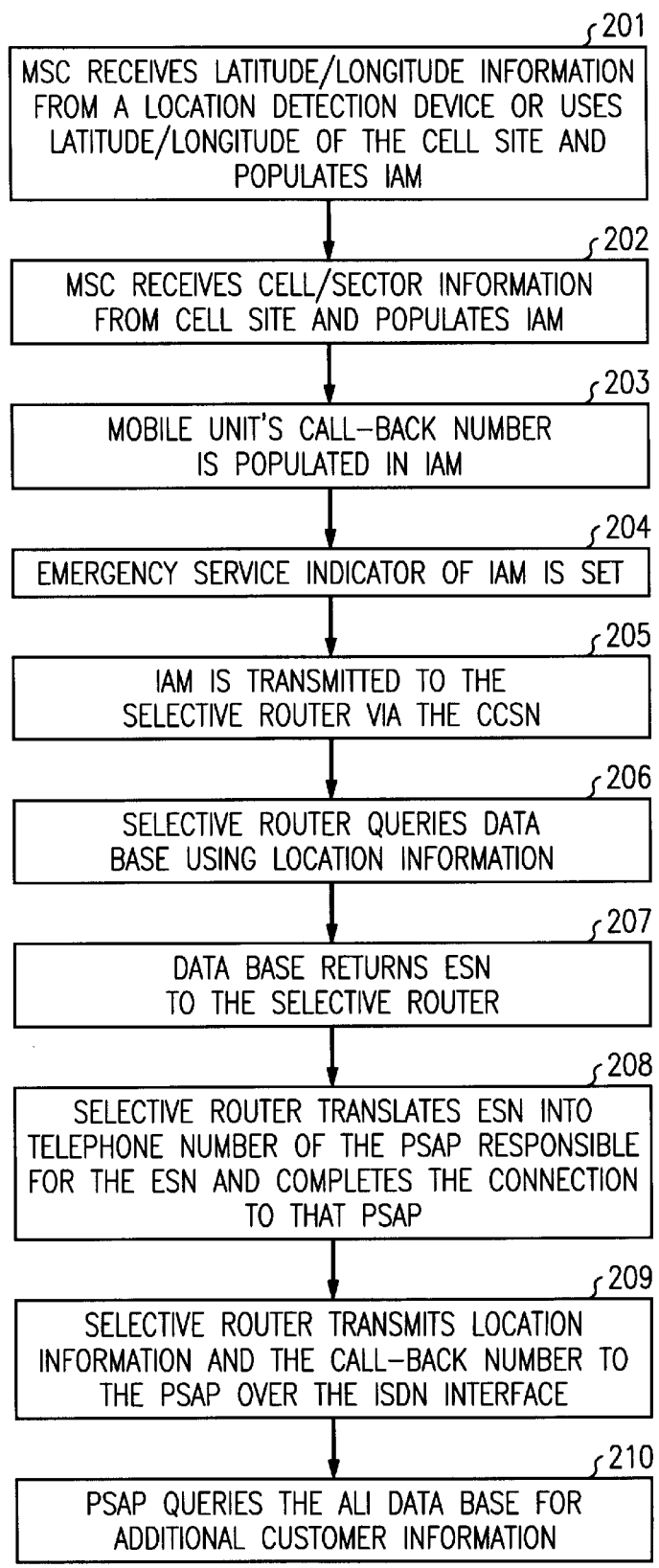
FIG. 2 is a flow diagram describing the operation of the system of the invention.
Figure 3:
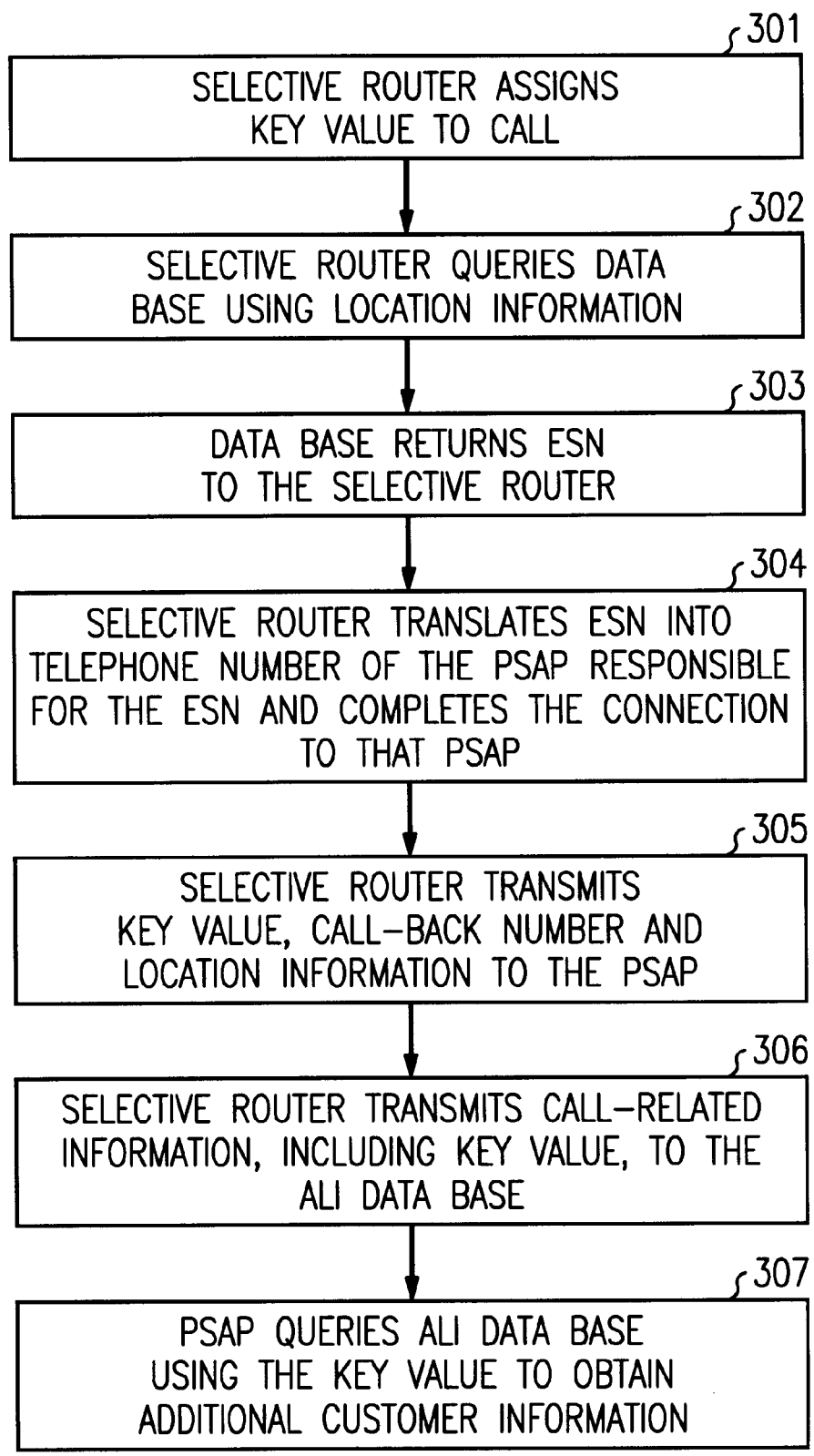
FIG. 3 is a flow diagram showing an alternate operation of the system of the invention.

If interface 32 is an analog interface, steps 206 through 210 of FIG. 2 are replaced by steps 301 through 307 of FIG. 3. Specifically, upon receipt of the IAM, the selective router 2 assigns a unique ANI key value to this call and populates the ANI key field with this value (block 301). The ANI key value is used to correlate the call with the ALI query. For PSAPs with 10-digit ANI capability, the ANI key field is populated with the directory number, i.e. the number of the wireless device. For PSAPs with 7-digit ANI capability a unique value is used to indicate that the call is from a mobile wireless unit and to correlate the call with the ALI query. For example, the ANI could be populated as 911xxxx where 911 indicates that the call is an emergency call and the 4-digit string is the unique key value. Alternatively, a dedicated numbering plan digit (NPD) can be used indicating calls originating from wireless MSC trunks. In this embodiment the 7-digit number is that of the charge number and the ANI key value need not be delivered to the ALI data base since it is passed as the least significant 7 digits within the charge number field.

The selective router 2 then queries data base 40 using the PDD or latitude/longitude (block 302). The PDD and latitude/longitude are correlated to an ESZ in the same manner that an ANI for a land line telephone is correlated to an ESZ as previously described. Data base 40 identifies the ESZ and transmits an emergency services number (ESN) identifying the ESZ to the selective router (block 303). The selective router 2 selects the PSAP 30 designated to serve the returned ESN and routes the call to that PSAP (block 304). The selective router 2 also delivers the ANI key value to that PSAP and passes the related call information of the ChgN and CdPn and the ANI key to the ALI data base 48 (block 305). Note, this interface could pass the call related information directly to a PSAP adjunct such as a server rather than via the ALI data base. The selective router 2 then transmits call related information including the key value to the ALI data base (block 306). The PSAP can then query the ALI data base using the key value to obtain additional customer information (block 307).

Referring again to FIG. 2, after the selective router 2 initiates routing of the call to the appropriate PSAP 30, a telephone of that PSAP is rung (block 211). The PSAP 20 then queries the ALI data base 48 using the unique ANI key to obtain additional customer information such as directory number, name, address or the like (block 212). Again, if necessary, the ALI data base can query WALI data base 57 to obtain additional customer information. The ALI data base correlates the query from the PSAP with the ESZ/ALI directive received from the selective router. For example, if the unique key value from the selective router includes the introductory prefix string 911, then the ALI recognizes a wireless call and searches for the 911xxxx key value. Alternatively, if the NPD is dedicated to wireless calls, a search for a match between the call back number and seven digit ANI is performed. The ALI provides at least seven significant digits of the actual 10 digit call back number, CdPN (PDD) and other subscriber information (e.g. subscriber name, home residence directory number, home residence street address and other information) to the PSAP. The PSAP agent answers the call and a voice connection is established between the wireless unit and the PSAP where the PSAP operator has subscriber information at its disposal.

Because the IAM message from the MSC includes both cell/sector information and latitude/longitude information, the selective router has the option of using either for selecting the appropriate ESZ and PSAP. It is contemplated that not all calls will be tracked by location detection systems. For example, location detection systems may not be uniformly deployed in less populated areas. Where no location detection information is provided, the MSC can either transmit no latitude/longitude information or it can transmit the latitude/longitude of the cell site itself since this location is known, fixed and does not rely on location detection systems. Because the selective router receives more than one type of location information, it is necessary to prioritize in which information (i.e. longitude/latitude or cell/sector) the selective router will route the call. The priority can be set at the selective router such that the selective router always uses latitude/longitude information if it is available and, if it is not available, the selective router uses the cell/sector information. Alternatively, the selective router could set priorities on a per MSC basis such that different priority schemes are used for different MSCs. For example, if a MSC has location detection information available, the latitude/longitude information is used. If location detection system information is not available, the cell/sector is used. If cell/sector information is not available, the latitude/longitude of the cell site is used.

As an alternative to maintaining the priority scheme in the selective router, the priority can be set by the MSC. Specifically, in the IAM a field is provided indicating the preferred priority of the three types of location information described above. The MSC could set the priority on a per call basis such that for each call the MSC determines if location detection system information and/or cell/sector information is available and prioritizes accordingly. If the same information was available for all calls to a MSC, the priority could be set once for all calls from that MSC. Upon receiving the IAM message from the MSC, the selective router would attempt to route the call based on the received priority scheme. If for some reason, the selective router could not route the call based on the highest priority information, it would attempt to route the call based on decreasing priority information until routing could be completed.

In addition to prioritizing routing information, an accuracy indicator for the latitude/longitude information could also be included in the IAM. Specifically, the accuracy information also could be included in the generic digits parameter (GDP) of the IAM. This information would be passed to the PSAP such that the PSAP could inform responding emergency service personnel of the accuracy if the caller's location. For example, if the location detection system information is accurate to ±50 meters, this accuracy indicator could be transmitted to the emerging personnel thereby enhancing response capabilities. Because different location detection systems have different levels of accuracy and because the accuracy of a system can be affected by terrain, being able to provide real time data reflecting the accuracy for a particular call is very advantageous. Finally, the accuracy indicator also can be used with the cell/sector information or with the latitude/longitude of the cell site to provide emergency personnel with the actual range of the response area.

It is to be understood that the above description is only of one preferred embodiment of the invention. For example, the system of the invention can be for other than emergency calls. The PSAPs could be replaced by answering positions of an 800 number service where the calls are routed to the appropriate answering position based on the actual location of the caller. Moreover, it is to be understood that the MSC could be connected to the selective router via the public switched network rather than using a direct point-to-point connection as shown. In such an arrangement, the caller location information is used by the public switched network to identify the selective router that is to handle the call. The call is routed to that selective router and the PSAP responsible for the call is connected as previously described. Numerous other arrangements may be devised by one skilled in the art without departing from the scope of the invention. The invention is thus limited only as defined in the accompanying claims.

What is claimed is:

1. A method for processing an emergency service call from a wireless device at a location in a wireless network of the type having at least one mobile switching center (MSC) and a plurality of public safety answering positions (PSAPs) connected to a selective router for routing the calls from the MSC to one of said PSAPs, said MSC being connected to the selective router over a common channel signaling network and said PSAPs being connected to said selective router over integrated services digital network (ISDN) interfaces, comprising the steps of:

receiving a message at said selective router over said common channel signaling network, said message including information relating to the location of the wireless device and a directory number for the wireless device;

querying a data base using said information to identify one of the plurality of PSAPs to handle the call;

completing a connection from said wireless device to said one of the plurality of PSAPs; and transmitting said information to said one of the plurality of PSAPs over the ISDN interface.

2. The method according to claim 1, wherein said information includes a latitude and longitude corresponding to the location of the wireless device.

3. The method according to claim 1, wherein said information includes a cell and cell sector corresponding to the location of the wireless device.

4. The method according to claim 1, wherein said information includes a latitude and longitude and a cell and cell sector corresponding to the location of the wireless device.

5. The method according to claim 1, further including the step of said one of the plurality of PSAPs querying a second data base using said directory number to obtain subscriber information.

6. The method according to claim 1, further including the step of said one of the plurality of PSAPs querying another data base using said information to obtain geographic information.

7. The method according to claim 1, further including the step of transmitting an indication that the call is an emergency services call in said message.

8. The method according to claim 1, wherein said message is an initial address message (IAM).

9. A system for processing an emergency services call in a wireless network, comprising:

a selective router connected to a plurality of public service answering positions (PSAPs) over ISDN interfaces;

a mobile switching center receiving an emergency call from a wireless device and in response to the emergency call transmitting a message to said selective router over a common channel signaling network, said message including information relating to the location of the wireless device and a directory number for the wireless device;

a data base correlating the information to the PSAPs, said data base transmitting an identification of a selected PSAP to the selective router based on a query from the PSAP including the information; and means for completing a connection from the wireless device to the selected PSAP over the ISDN interface.

* * * * *